June 8, 1926.

I. E. McCABE 1,588,380

ALTITUDE GAUGE AND THERMOMETER

Filed March 4, 1922

Inventor:-
Ira E. McCabe,

Langdon Moore, Attorney

Patented June 8, 1926.

1,588,380

UNITED STATES PATENT OFFICE.

IRA E. McCABE, OF CHICAGO, ILLINOIS.

ALTITUDE GAUGE AND THERMOMETER.

Application filed March 4, 1922. Serial No. 541,159.

This invention comprises a combined altitude gauge and thermometer. It is contemplated to produce a single, compact device wherein there is a pressure responsive device so arranged as to be registered on a dial in terms of height and combine therewith a thermometer of the thermostatic metal type, the whole being housed within a casing and provided with a threaded stem adapted to be inserted in a threaded opening in a boiler or the like.

It has heretofore been proposed to provide a gauge to show height of water or the like in a heating plant and there has been combined therewith a thermometer of the liquid variety. In use it has been found that these are easily broken or disarranged and the present invention is directed to a simple and useful device which may be readily threaded into the opening usually provided in a household heating plant, for instance, by unskilled labor, and when so placed will accurately register and be less subject to breakage and getting out of order than those heretofore provided.

An embodiment of the invention is illustrated in the accompanying drawing, the following views being shown:—

Figure 1:
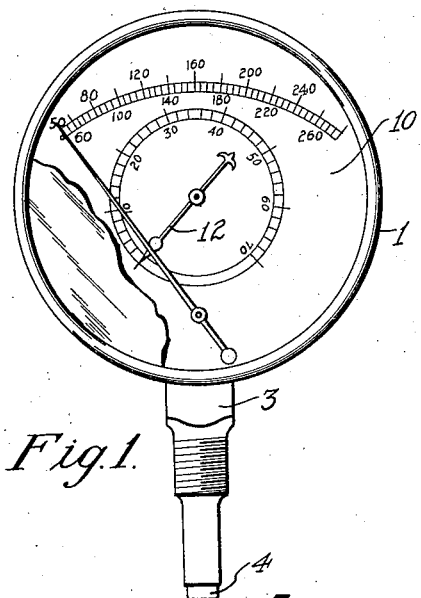
Fig. 1 is a view in front elevation, a portion of the glass front being shown as broken away.
Figure 4:
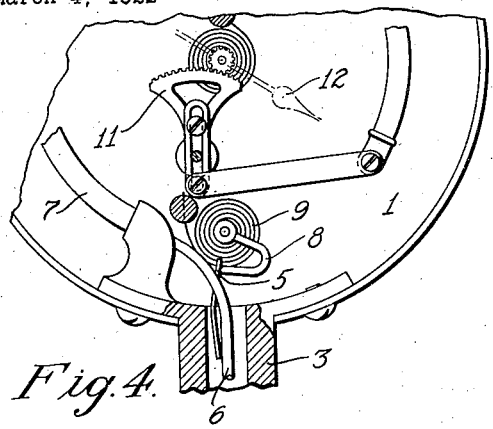
Fig. 4 is a detail view showing the altitude gauge in the limit of its movement in one direction.
Figure 2:
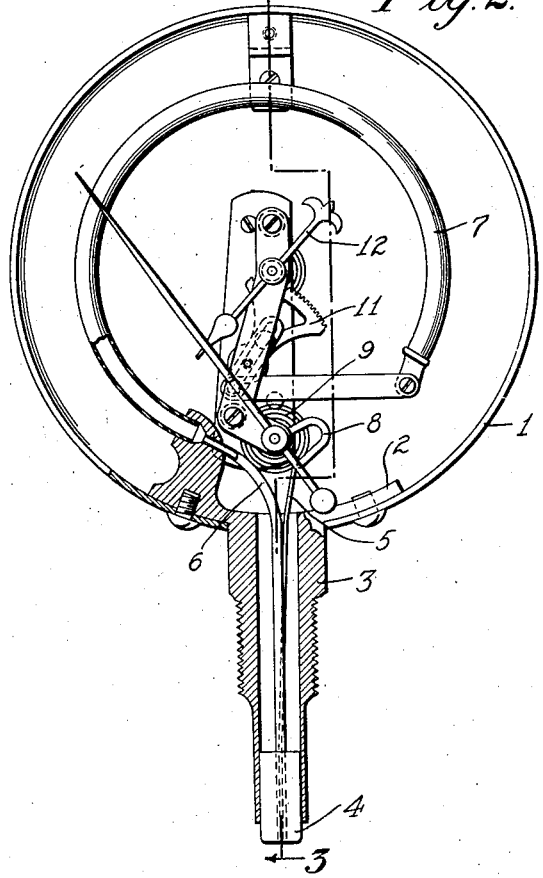
Fig. 2 is a similar view with the dial removed and showing the interior arrangement of the working parts.
Figure 3:
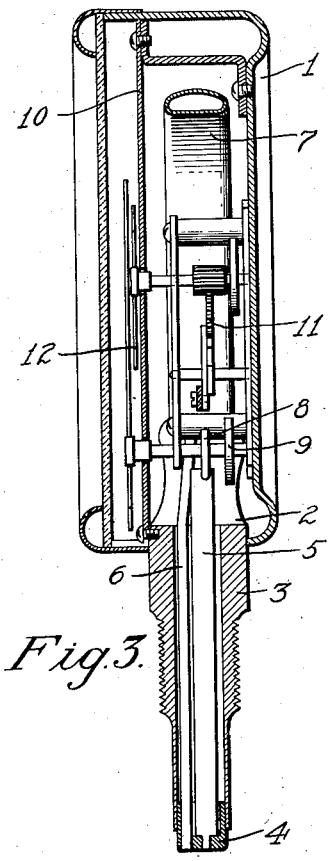
Fig. 3 is a view in vertical section on line 3—3 of Fig. 2.

In these views 1 represents a casing provided with the usual open front and view glass. Associated with the casing there is a base or support 2 for a nipple 3. This latter is in the form of an elongated hollow cylindrical member threaded externally so as to be readily inserted in an opening in a hot water boiler, for example. The elongated nipple or hollow member is fixed to the base and is plugged at its outer end to provide a base or support 4 within which there is mounted a piece of thermostatic metal 5. The arrangement is such that the metal is supported at one end only, but securely, in the base or plug 4, and from that point to its outer extremity is free to move within the casing under the influence of heat or cold and its free end moves under this influence in a manner well known in this art. This base or plug 4 is also provided with an opening through which there passes a pipe 6, the pipe passing upwardly through the hollow cylindrical nipple and into communication with a pressure responsive device 7. As here shown this is an ordinary Bourdon tube, mounted suitably on support 2, its other end being free to move under pressure variations. The pipe 6 will be in communication with the heating medium directly when the nipple 3 is inserted in a boiler, and means are provided for indicating on a dial, in compact and separate arrangement both the pressure and temperature variations.

As here shown the free end of the thermostat 5 is in contact with an arm 8 carried by a stem which is suitably mounted in bearings within the casing, and resistance is offered to the movement of the arm in one direction by a spring 9, associated with the stem in a well known manner. One end of this stem passes through an opening in a dial 10 and carries a hand which points graduations representing degrees of temperature marked in accurate manner at one portion of the dial.

The free end of the Bourdon tube is connected by a link to a segment or sector 11, carried by a stem suitably mounted within the casing and cooperating with a staff which passes through an opening in the face of the dial and carries a hand 12. This latter is shorter and cooperates with circularly disposed graduations representing feet of altitudes. The arrangement provides the temperature and altitude on the dial in such a way that there is no liability of conflicting the two and permits the arrangement of the working parts within the casing in such a way that each will be readily accessible for repair or adjustment and without interference with the other. While the invention has been disclosed in the embodiment herein illustrated, it is understood that certain changes and substitutions are contemplated as within its scope as set forth in the claim.

What I claim is:—

A combined altitude gauge and thermometer comprising a casing, indicators mounted therein adapted to travel over scales graduated in feet of altitude and degrees of temperature, respectively, and operating means mounted within the casing for the respective indicators, in combination with a hollow nipple extending from the casing having a shoulder secured to the inner wall thereof and a plug closing the exterior end of the nipple, actuating means for the respective indicators carried by the nipple independent of the casing comprising a Bourdon tube mounted on the shoulder of the nipple having a pipe connected to the fixed end leading through the interior of the nipple, passing through the end of the plug, and opening exteriorly thereof, and a thermostatic strip fixed at one end in the plug and extending through the interior of the nipple into the interior of the casing, the free ends of the Bourdon tube and thermostatic strip engaging the operating means of the altitude and temperature indicators respectively.

In testimony whereof I affix my signature.

IRA E. McCABE.